(12) United States Patent
Liang et al.

(10) Patent No.: US 6,359,366 B1
(45) Date of Patent: Mar. 19, 2002

(54) HYBRID PERMANENT MAGNET/SYNCHRONOUS MACHINES

(75) Inventors: Feng Liang, Canton; John Michael Miller, Saline; Xingyi Xu, Canton, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/567,345

(22) Filed: May 9, 2000

(51) Int. Cl.$^7$ ................................................. H02K 1/22
(52) U.S. Cl. ................................... 310/263; 310/156.66
(58) Field of Search .......................... 310/263, 261, 310/156.01, 156.02, 156.38, 156.43, 156.47, 156.66, 156.68, 156.69, 156.71, 156.74, 156.75, 156.76, 181, 154.28, 154.29; 29/598, 596

(56) References Cited

U.S. PATENT DOCUMENTS

| | | | |
|---|---|---|---|
| 4,959,577 A | 9/1990 | Radomski | 310/263 |
| 5,132,581 A | 7/1992 | Kusase | 310/263 |
| 5,397,975 A | 3/1995 | Syverson | 322/146 |
| 5,536,987 A | 7/1996 | Hayashi et al. | 310/263 |
| 5,543,676 A | 8/1996 | York et al. | 310/263 |
| 5,578,885 A | 11/1996 | Alford et al. | 310/263 |
| 5,663,605 A | 9/1997 | Evans et al. | 310/181 |
| 5,780,953 A | 7/1998 | Umeda et al. | 310/263 |
| 5,825,116 A | * 10/1998 | Ishikawa | 310/263 |
| 5,903,084 A | * 5/1999 | Asao et al. | 310/263 |
| 5,965,967 A | 10/1999 | Liang et al. | 310/263 |

* cited by examiner

Primary Examiner—Nicholas Ponomarenko
Assistant Examiner—Dang Dinh Le

(57) ABSTRACT

A rotor 33, 133 for use in an electrical machine 100 having permanent magnets 34, 134 included therein, each permanent magnet 34, 134 between an adjacent pair of poles 32, 132, wherein each adjacent pole 32, 132 has an opposite polarity. Each permanent magnet 34, 134 has a magnetization polarity on its radially-outward surface 38, 138, and each adjacent permanent magnet 34, 134 has the opposite polarity on its radially-outward surface 38, 138. In addition, each pair of permanent magnets 34, 134 have the same magnetic polarity on their adjacently facing surfaces. This arrangement of permanent magnets 34, 134 may be used on electrical machines 100 having either a Lundell-type rotor 33 or salient pole rotor 133. The arrangement of permanent magnets 34, 134 increases the output power and efficiency of the electrical machine 100 while decreasing magnetic noise.

7 Claims, 4 Drawing Sheets

HYBRID PERMANENT MAGNET/SYNCHRONOUS MACHINES

TECHNICAL FIELD

The present invention relates to rotating electrical machines and more particularly to permanent magnet enhanced rotors for generators of automobiles.

BACKGROUND

Alternators (generators) are used to provide electrical power for running accessories and to charge batteries of automobiles. The combination of increased electrical power demand and generally smaller vehicles creates the demand for greater power output and higher efficiency without greatly increasing the size of the alternator.

In an attempt to meet all of these requirements, several known designs employ a "hybrid" alternator design in which a traditional wound-field rotor is supplemented with permanent magnets. The addition of permanent magnets increases the rotor flux, and hence power output, as compared with traditional alternators. One such design is described in U.S. Pat. No. 4,959,577 (hereinafter the '577 patent), issued to Radomski. In this patent, permanent magnets are installed between the pole fingers of an alternator. The magnets are magnetized in a tangential direction with respect to the rotor's axis of rotation. While the design of the '577 patent can provide some advantages over standard Lundell rotors, the tangential magnetization is believed to be inefficient because a substantial amount of the permanent magnet flux is not directly linked with the stator windings. Such linking may provide benefits of higher electrical output and higher power density (i.e. power output per unit volume of the alternator) of the alternator.

In an attempt to directly link permanent magnet flux with the stator windings, known designs have altered the arrangement of the permanent magnets. One such design is disclosed in U.S. Pat. No. 5,965,967 (hereinafter the '967 patent), issued to Liang.

In the '967 patent, a rotor includes a field coil magnetically coupled with a first pole piece and a second pole piece which when energized magnetizes the fingers of the first pole piece and second pole piece with opposite magnetic polarities. The rotor also comprises a plurality of permanent magnets, at least two disposed between each first pole finger and an adjacent second pole finger and having a radially-outward surface and an adjacent tangentially-facing surface of first electromagnetic polarity and having a radially-inward surface and an adjacent tangentially surface of an opposite magnetic polarity.

Although the design of the '967 patent directly links permanent magnetic flux with the stator windings, and hence increases power output, the permanent magnet arrangement may not make optimal use of the permanent magnets. The '967 patent has two permanent magnets per rotor slot having opposite polarities. This arrangement introduces harmonic flux, which results in decreased efficiency and increased magnetic noise.

In addition, the design of the '967 patent may not be used in salient pole type synchronous machines, whose rotor poles are not tapered, because the net permanent magnet flux linking to the stator winding is zero. The net flux linkage is zero because the permanent magnet flux linkage produced by the permanent magnets (preferably 2 magnets per rotor slot) in the same rotor slot cancels each other out.

It would therefore be desirable to increase the power output of a hybrid permanent magnet machine while increasing the efficiency and decreasing the magnetic noise compared to known systems.

SUMMARY OF THE INVENTION

One object of the present invention is to increase the power output of hybrid permanent magnet synchronous machines. A second object of the present invention is to improve the efficiency of the hybrid permanent magnet synchronous machines. A third object of the present invention is to lower magnetic noise of a hybrid permanent magnet synchronous machine.

The present invention accomplishes all three objects by providing a new arrangement of permanent magnets that can be used in either a Lundell-type or salient pole-type rotor.

The present invention is a rotor for use in an electrical machine, where the rotor has an axis of rotation and has a first and second pole piece, a field winding (preferably a field coil or rotor coil) on the rotor, and a set of permanent magnets disposed between the first and second pole pieces. The first pole piece and second pole piece each has a plurality of axially-extending pole fingers. The field winding is magnetically coupled with the first pole piece and second pole piece which when energized magnetizes the first pole fingers with a north magnetic polarity and the second pole fingers with a south magnetic polarity.

The permanent magnets are preferably trapezoidal shaped and are grouped into two sets. One of the first set of permanent magnets is disposed in every other rotor slot with its radially-inward surface adjacent to the inner rotor portion and its side surfaces abutting adjacent pole pieces. One of the second set of permanent magnets is disposed within each of the other rotor slots not occupied by the first set of permanent magnets with its radially-inward surface adjacent to the inner rotor portion and its side surfaces abutting adjacent pole pieces. Preferably, the length of each permanent magnet substantially extends the length of the rotor slot and the length of the adjacent pole pieces that it is contained within. The first set of permanent magnets are magnetized with its radially-outward surface having a north magnetic polarity and each side surface having the magnetic polarity of its adjacent pole pieces. The second set of permanent magnets are magnetized with its radially-outward surface having a south magnetic polarity and each side surface having the magnetic polarity of its adjacent pole piece. Each side surface of each permanent magnet preferably contacts each corresponding adjacent pole piece.

As a result of this configuration of permanent magnets, the present invention increases the rotor flux in two ways. First, permanent magnet flux travels from one set of permanent magnets to the second set of permanent magnets through the air gap, thereby increasing the flux linkage of the stator winding which in turn increases the alternator power output. Second, permanent magnet flux in the rotor cancels flux generated by the field current to some extent, which reduces rotor core saturation and further increases rotor flux. Therefore, the new permanent magnet arrangement has better permanent magnet utilization, which leads to higher electrical outputs and hence better performance.

Further, this new permanent magnet arrangement has lower harmonic fluxes than known arrangements such as the '967 patent because the permanent magnet flux changes more gradually in space. As a result, the loss caused by harmonic flux is lower, which gives rise to higher efficiency.

Also, one embodiment of this new permanent magnet arrangement has less magnetic noise than previous arrangements because the permanent magnets are not in parallel with the stator slots, allowing flux in the stator teeth to vary gradually rather than abruptly and hence reducing magnetic noise.

Other objects and advantages of the present invention will become apparent upon considering the following detailed description and appended claims, and upon reference to the accompanying drawings.

DESCRIPTION OF THE PREFERRED EMBODIMENT(S)

Figure 1:
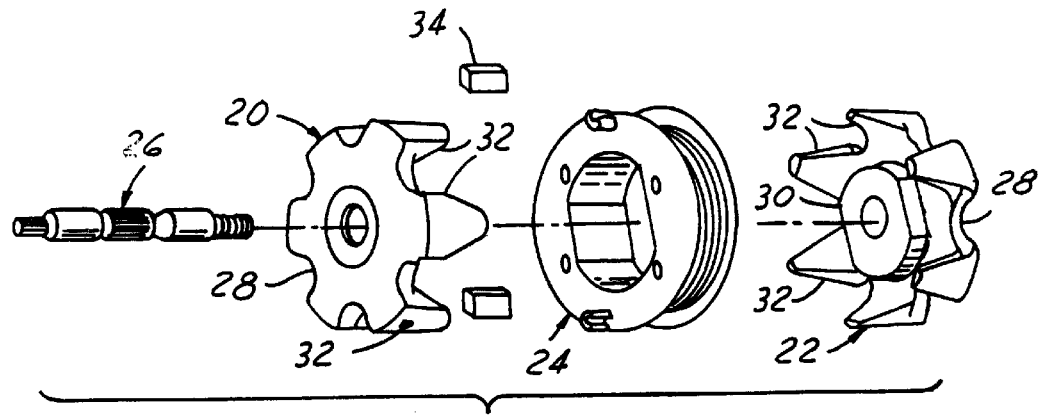
FIG. 1 is an exploded view of the relevant components of a Lundell-type rotor containing permanent magnets according to a preferred embodiment of the present invention.

Referring first to FIG. 1, illustrated are the relevant components of a known Lundell-type rotor according to a preferred embodiment of the present invention, including pole pieces 20 and 22 and field coil 24. These components are fixedly mounted for rotation on a shaft 26. Pole pieces 20 and 22 each includes a disk-shaped body 28, a hub 30 and a plurality of axially-extending pole fingers 32. Collectively, the body 28 and hub 30 are referred to as the inner rotor portion (shown as 23 on FIGS. 2–4). A permanent magnet 34 is disposed between each of the pole fingers 32. As is typical in a Lundell-type alternator (generator), the field coil 24 is preferably driven by unidirectional current controlled by a voltage regulator (not shown) that is applied to the coil 24 through a slip ring assembly (not shown) mounted to the rotor shaft 26.

Figure 2:
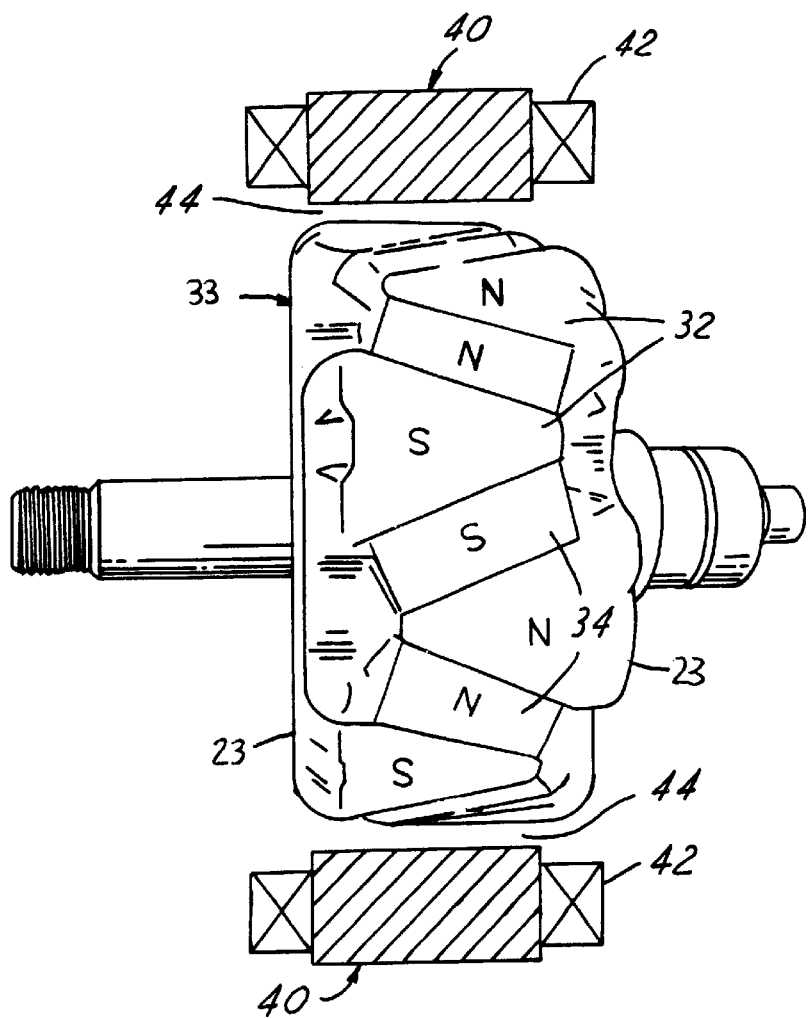
FIG. 2 is a side view of a Lundell-type rotor and stator according to one embodiment of the present invention.
Figure 3:
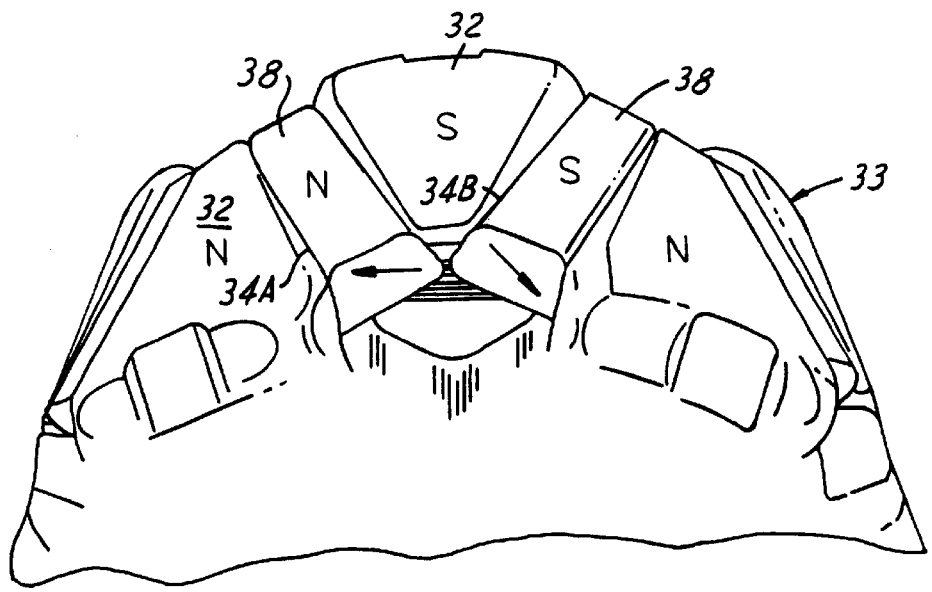
FIGS. 3 and 4 are partial views of the rotor of FIG. 2, from opposite ends of the rotor.
Figure 4:
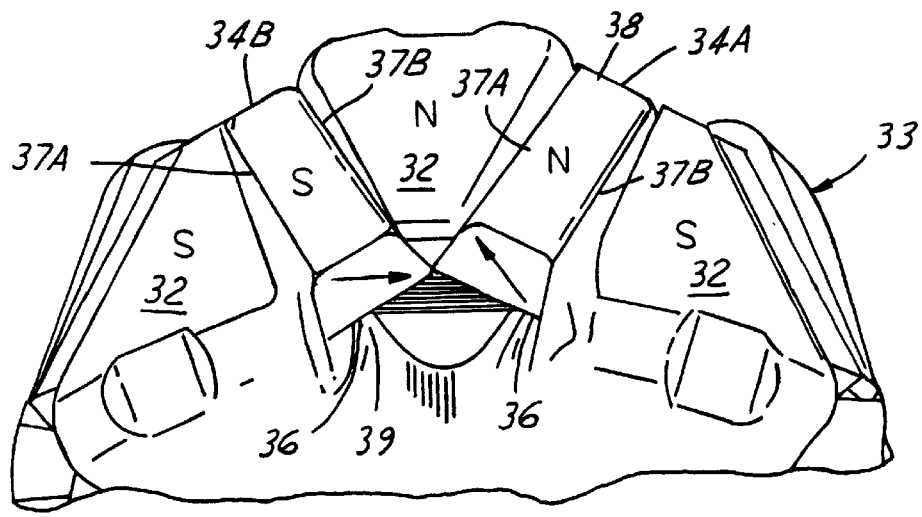

Referring now to FIGS. 2–4, a rotor 33 according to one preferred embodiment is shown. The rotor 33 includes pole pieces 20 and 22 each including an inner rotor portion 23. A permanent magnet 34 is disposed between each adjacent set of pole fingers 32. Further, FIG. 2 illustrates in cross-section a stator 40 of the electrical machine which includes stator windings 42. Rotor 33 and stator 40 are separated by an air gap 44.

Each permanent magnet 34 extends approximately the length of the pole finger 32 and has a radially-inward surface 36, a radially-outward surface 38, and two side surfaces 37A, 37B. The width of each permanent magnet 34 is similar to the width of each rotor slot 39 created between pole fingers 32. The permanent magnets are disposed in the rotor slot 39 so that side surface 37A of one permanent magnet 34 is adjacent to the opposite side surface 37B of the next adjacent permanent magnet 34 and so that the radially-inward surface 36 is adjacent to the field winding (shown as 24 in FIG. 1). In addition, it is preferable that each adjacent side surface 37A, 37B contacts the pole piece 32 between them. Each permanent magnet 34 is preferably mounted to the rotor slot 39 by adhesive, mechanical coupling or by another suitable fastening method.

Figure 5:
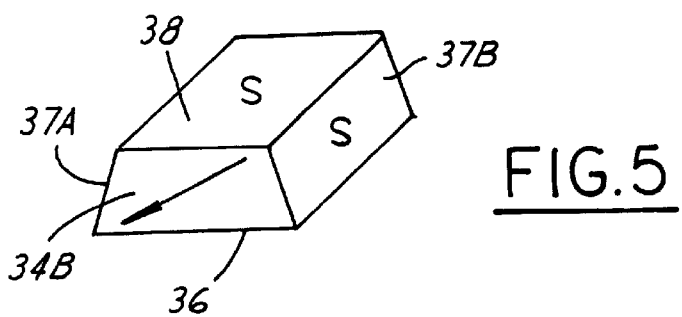
FIG. 5 is a perspective view of a permanent magnet of FIG. 3.

Magnetization polarity of permanent magnets is best described in FIGS. 3–5. Permanent magnets 34 are magnetized with a polarity that runs along their cross sections, as is shown by the arrows on permanent magnets 34A and 34B. Thus, for example, taking permanent magnet 34A, the radially-outward surface 38 is of north magnetic polarity ("N"), while the radially-inward surface 36 is of south magnetic polarity ("S"). The opposite is true for permanent magnet 34B, where the radially-outward surface 38 is of south magnetic polarity and the radially-inward surface 36 is of north magnetic polarity. Further, the side surfaces 37A and 37B of adjacent permanent magnets 34A, 34B are magnetized with the same magnetic polarity, and may be either north or south magnetic polarity. As shown in FIG. 4, side surface 37B of permanent magnet 34B and adjacent side surface 37A of permanent magnet 34A have north magnetic polarity.

Figure 6:
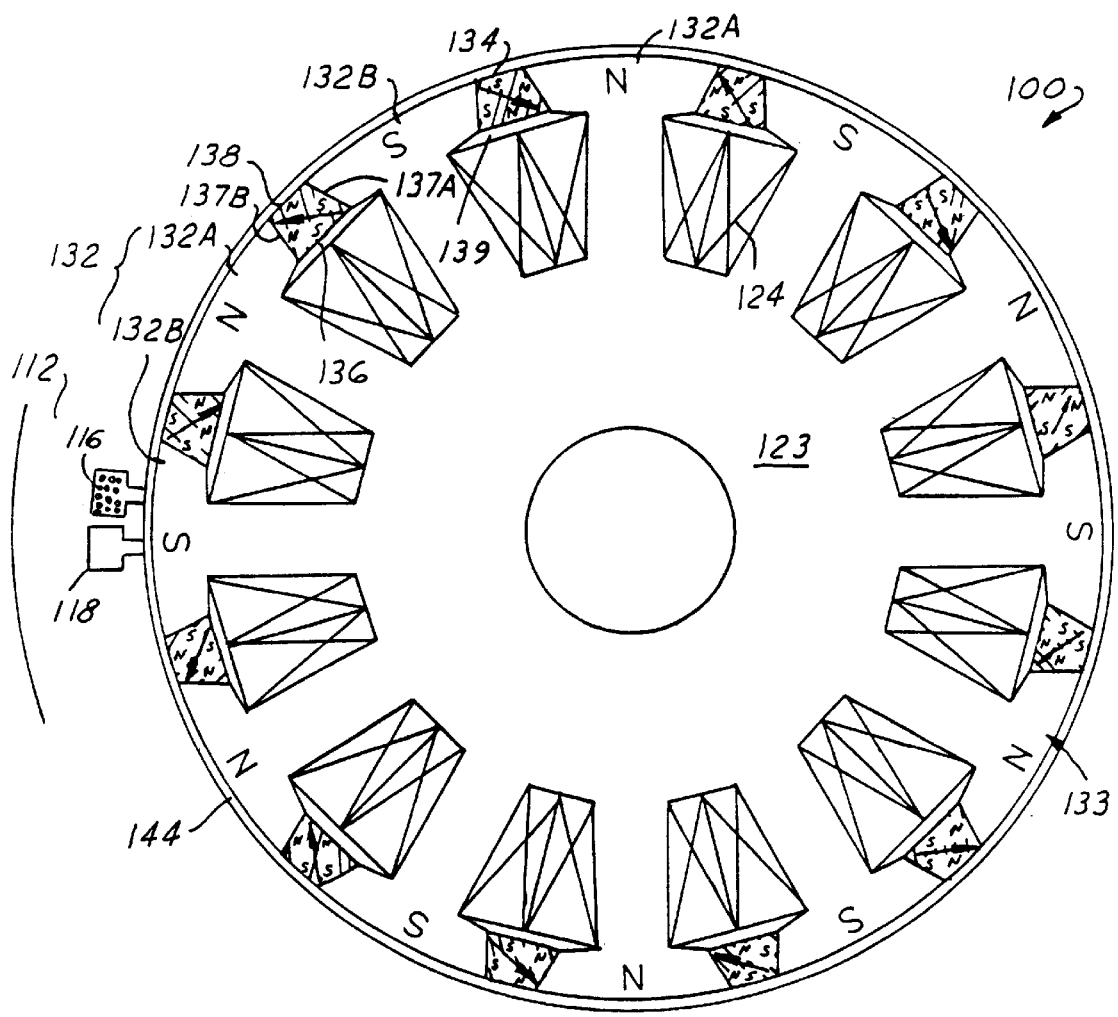
FIG. 6 is a side cross-sectional view of the salient pole-type rotor and stator portion of hybrid permanent magnet synchronous electric machine according to another preferred embodiment of the present invention.
Figure 7:
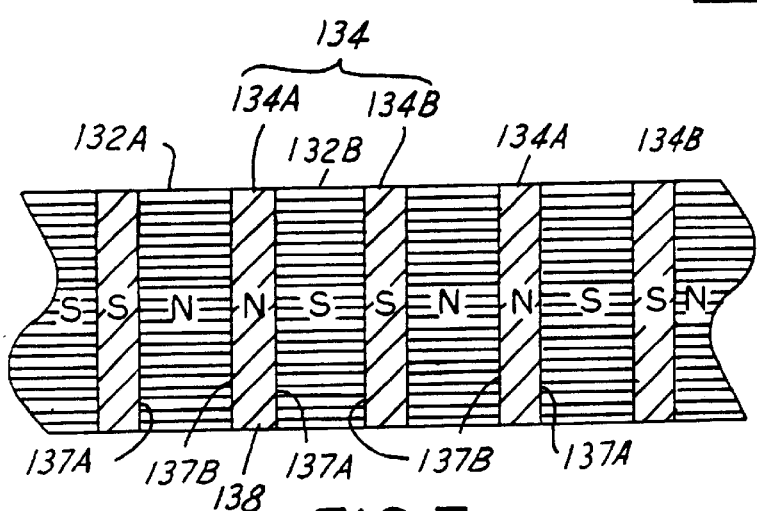
FIG. 7 is a top view of FIG. 6.

Referring now to FIG. 6 and 7, a cross-sectional view of a salient pole type rotor 133 contained with a hybrid permanent synchronous machine 100 according to another preferred embodiment of the present invention is illustrated. As opposed to a Lundell-type rotor, in which one field coil 24 is used regardless of the number of pole fingers 32, the salient pole type rotor 133 is characterized by an equal number of rotor coils 124 and poles 132.

Figure 8:
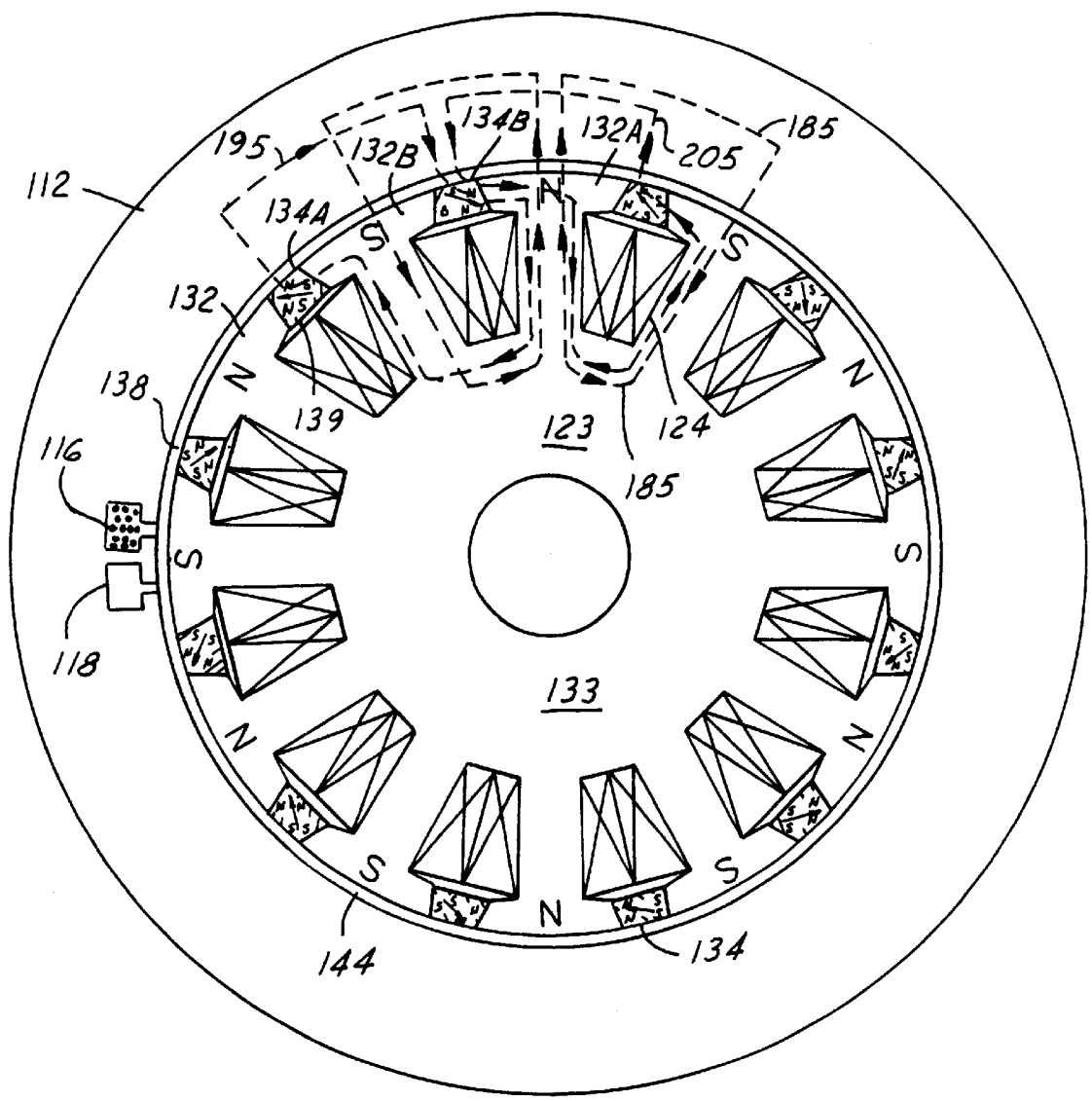
FIG. 8 is a side cross-sectional view of the rotor portion of FIG. 6 showing the permanent magnetic fluxes and fluxes generated by the rotor current.

In FIGS. 6 and 7, the hybrid permanent magnet synchronous machine 100 contains a salient pole rotor 133 fixedly mounted on a shaft (not shown) and contained within a stator core 112. The rotor 133 also has a plurality of poles 132 spaced around the outer perimeter of its inner rotor portion 123. The rotor 133 also has a rotor coil 124 which can be excited to produce a magnetic field whenever current is applied through slip rings (not shown) on the shaft by known methods. The rotor coils 124 are configured such that each adjacent pole 132 has an opposite polarity on its outer perimeter whenever current is applied. As illustrated in FIGS. 6–8, pole piece 132A is designated with north magnetic polarity, and pole piece 132B is designated with south magnetic polarity. The stator core 112 has a plurality of stator windings 116 contained within slots 118 on the stator core 112 to generate output whenever an excitation current is applied to the rotor coils 124 and the rotor 133 is driven by a driver (not shown), such as an engine.

Disposed between each adjacent pole finger 132 is a permanent magnet 134. Each permanent magnet 134 is preferably mounted to its two adjacent poles 132 by adhesive or by another suitable fastening method. Each permanent magnet 134 extends approximately the length of the pole finger 132 and has a radially-inward surface 136, a radially-outward surface 138, and two side surfaces 137A, 137B. The width of each permanent magnet 134 is similar to the width of each rotor slot 139 created between poles 132. The permanent magnets are disposed in the rotor slot 139 so that side surface 137A of one permanent magnet 134A is adjacent to the opposite side surface 137B of the next adjacent permanent magnet 134B and so that the radially-inward surface 136 is adjacent to the rotor coil 124. Preferably, side surfaces 137A and 137B on adjacent permanent magnets 134A, 134B are both in contact with their common pole 132.

The permanent magnets 134 are magnetized similarly as described above in FIGS. 3–5. The radially-outward surface 138 of every other permanent magnet 134A is of north magnetic polarity, while the radially-inward surface 136 is of south magnetic polarity. The opposite is true for permanent magnet 134B, where the radially-outward surface 138 is of south magnetic polarity and the radially-inward surface 136 is of north magnetic polarity. Further, the side surfaces 137A and 137B of adjacent permanent magnets 134A, 134B are magnetized with the same magnetic polarity as the pole 132 they both abut. As illustrated in FIG. 6, side surfaces 137A, 137B located adjacent to pole piece 132B have south magnetic polarity. It is also contemplated that side surfaces 137A, 137B could have north magnetic polarity while located adjacent to pole piece 132A.

Referring now to FIG. 8, an illustration of the permanent magnet flux 195 and the flux 185 generated by rotor current is shown according to the present invention.

Permanent magnet flux 195 developed by each permanent magnet flows from the north magnetic pole of permanent magnet 134A, through the air gap 144 and stator 112. The permanent flux flows back through the air gap 144 and returns to the south magnetic pole of permanent magnet 134B. The permanent magnet flux 195 then flows from the north pole of permanent magnet 134B, through the pole piece 132A and into the inner rotor portion 123. The permanent magnet flux then flows through pole piece 132B and returns to the south magnetic pole of permanent magnet 134A. The permanent magnetic flux path 195 is illustrated for only one set of magnets 134A, 134B, in FIG. 8; however, it is apparent that the flux path 195 is the same for all six sets of magnets.

A second permanent magnet flux 205 developed by each permanent magnet flows from the north magnetic pole of permanent magnet 134A, through the air gap 144 and stator 112. The permanent flux flows back through the air gap 144 and returns to the south magnetic pole of permanent magnet 134B. The permanent magnet flux 205 then flows from the north pole of permanent magnet 134B, through the pole piece 132A and into the inner rotor portion 123. The permanent magnet flux then flows through pole piece 132B and returns to the south magnetic pole of permanent magnet 134A. The permanent magnetic flux path 205 is illustrated for only one set of magnets 134A, 134B, in FIG. 8; however, it is apparent that the flux path 205 is the same for all six sets of magnets.

Assume now that the rotor coil 124 is energized. When current is applied to the rotor coils 124, magnetic flux 185 is generated. As shown in FIG. 8, this flux 185 flows out of pole piece 132A, through air gap 144 and into stator 112. The flux 185 then flows back through air gap 144 and pole piece 132B and into the inner rotor portion 123, finally returning to pole piece 132A and continuing the loop for as long as the current remains. The current magnetic flux 185 is illustrated rotating around two groups of rotor coils 124, in FIG. 8, however, it is apparent that the flux path 185 is the same for all twelve sets of rotor coils as illustrated.

With the polarities of the permanent magnets 134 and rotor coils 124, as has been described, the flow of permanent magnet flux 195 through poles 132A and 132B is in the opposite direction of the flux 185 generated by the current in the rotor coil 124. As a result, the flux density in the poles 132 and inner rotor portion 123 is reduced . This results in a corresponding drop of the magnetomagnetic force in the poles 132 and in the inner rotor portion 123. Therefore, the flux cancellation in the poles 132 and inner rotor portion 123 results in an increase in the flux traveling from the rotor 133 to the stator 112, which in turn increases the power output.

The permanent magnet flux 195 and current magnetic flux 185 flow as shown in FIG. 8 is similar to the permanent magnetic flux and current magnetic flux flow in the Lundell-type arrangement as shown in FIGS. 1–5.

The present invention as described offers many advantages over previous hybrid magnet synchronous motors, including higher output, higher efficiency, and lower magnetic noise levels.

First, because there is only one permanent magnet 134 per rotor slot 139, the present invention does not have permanent magnet flux cancellation within the rotor slot 139 as in the '967 patent when applied to a salient pole synchronous machine whose rotor poles are not tapered. As such, the rotor flux associated with the permanent magnet 134 is significantly increased, which in turns increases the alternator (generator) output power.

Another important feature of the present invention as described above is that rotor flux and hence power output is further increased because the permanent magnet flux 195 in the rotor 33, 133 is against the flux 185 generated by the field current.

The new arrangement also lowers harmonic fluxes because the permanent magnet flux 195 changes more gradually in the space, which lowers the core losses caused by the harmonic flux and, therefore, raises the efficiency of the machine 100.

Further, the magnetic noise level in the first embodiment of the present invention as shown in FIGS. 2–4 is lower than that of the '967 patent because of lower harmonic flux.

While the invention has been described in terms of preferred embodiments, it will be understood, of course, that the invention is not limited thereto since modifications may be made by those skilled in the art, particularly in light of the foregoing teachings.

What is claimed is:

1. A rotor for use in an electrical machine, said rotor having an axis of rotation and comprising:

a first pole piece having a plurality of axially-extending first pole fingers and a first inner rotor portion;

a second pole piece having a plurality of axially-extending second pole fingers and a second inner rotor portion;

a field coil magnetically coupled with said first pole piece and said second pole piece which when energized magnetizes said first pole fingers and said second pole fingers such that said first pole fingers have a north magnetic polarity and said second pole fingers have a south magnetic polarity;

a plurality of permanent magnets having a first set of permanent magnets and a second set of permanent magnets;

one of said first set of permanent magnets disposed between one of said plurality of first pole fingers and one of said plurality of second pole fingers, said one of said first set of permanent magnets having a first radially-inward surface, a first radially-outward surface, a first side surface and a second side surface, wherein said first side surface is adjacent to one of said plurality of first pole fingers and substantially extends the length of one of said plurality of first pole fingers, wherein said second surface is adjacent to one of said plurality of second pole fingers and substantially extends the length of one of said plurality of second pole fingers;

one of said second set of permanent magnets disposed between one of said plurality of first pole fingers and the other of said two adjacent said plurality of second pole fingers and having a second radially-inward surface, a second radially-outward surface, a third side surface and a fourth side surface, wherein said third side surface is adjacent to said first pole finger and substantially extends the length of said first pole finger, wherein said fourth side surface is adjacent to said other of said two adjacent said plurality of second pole fingers and substantially extends the length of said other of said two adjacent said plurality of second pole fingers; and wherein said first radially-outward surface and said first side surface have a north magnetic polarity and wherein said second radially-outward surface and said fourth side surface have a south magnetic polarity.

2. An electrical machine having a rotor as defined in claim 1.

3. An electrical machine having a rotor according to claim 2, wherein said electrical machine is an alternator.

4. The electrical machine having a rotor as in claim 2, wherein said plurality of permanent magnets produces permanent magnetic flux from one of said first set of permanent magnets to each of said second set of permanent magnets located adjacent to said one of said first set of permanent magnets such that said permanent magnet flux creates a flux linkage in a stator winding on the electrical machine.

5. The electrical machine of claim 2, wherein said plurality of permanent magnets produces permanent magnetic flux from said one of said first set of permanent magnets to one of said second set of permanent magnets located adjacent to said one of said plurality of permanent magnets such that said magnetic flux acts in opposition to a field current flux in said first pole piece and said second pole piece, whereby flux linkage is increased in a stator winding of the electrical machine, thereby increasing output power from said stator winding of the electrical machine.

6. The electrical machine of claim 2, wherein said plurality of permanent magnets produces permanent magnetic flux from one of said first set of permanent magnets to one of said second set of permanent magnets located adjacent to said one of said plurality of permanent magnets such that said permanent magnet flux creates a flux linkage in a stator winding on the electrical machine; and wherein said magnetic flux acts in opposition to a field current flux in said first pole piece and said second pole piece, whereby said flux linkage is increased in a stator winding of the electrical machine, thereby increasing output power from said stator winding of the electrical machine.

7. The electrical machine of claim 1, wherein each of said plurality of permanent magnets is affixed to the rotor between one of said plurality of first pole fingers and one of said plurality of second pole fingers.

* * * * *